United States Patent
Kuntz et al.

(10) Patent No.: US 12,109,920 B2
(45) Date of Patent: Oct. 8, 2024

(54) ADJUSTING DEVICE FOR A VEHICLE SEAT AND VEHICLE SEAT

(71) Applicant: Adient US LLC, Plymouth, MI (US)

(72) Inventors: Oliver Kuntz, Wermelskirchen (DE); Van-Toan Ho, Solingen (DE); Frank Schlueter, Moers (DE); Igor Gordeenko, Frechen (DE)

(73) Assignee: Adient US LLC, Plymouth, MI (US)

( * ) Notice: Subject to any disclaimer, the term of this patent is extended or adjusted under 35 U.S.C. 154(b) by 90 days.

(21) Appl. No.: 17/823,124

(22) Filed: Aug. 30, 2022

(65) Prior Publication Data

US 2023/0063384 A1   Mar. 2, 2023

(30) Foreign Application Priority Data

Sep. 2, 2021   (DE) .................. 10 2021 122 796.8
May 24, 2022   (DE) .................. 10 2022 113 116.5

(51) Int. Cl.
*B60N 2/225*   (2006.01)

(52) U.S. Cl.
CPC .................................. *B60N 2/2251* (2013.01)

(58) Field of Classification Search
CPC ........ B60N 2/16; B60N 2/165; B60N 2/1655; B60N 2/2251
See application file for complete search history.

(56) References Cited

U.S. PATENT DOCUMENTS

| | | | |
|---|---|---|---|
| 10,207,601 B2 * | 2/2019 | Suzuki | B60N 2/168 |
| 10,737,591 B2 * | 8/2020 | Ito | B60N 2/22 |
| 2007/0068583 A1 * | 3/2007 | Johnson | F16K 31/043 |
| | | | 137/625.31 |
| 2012/0046142 A1 * | 2/2012 | Miyawaki | F16H 57/082 |
| | | | 475/331 |
| 2018/0236903 A1 * | 8/2018 | Chatwin | B60N 2/3056 |
| 2019/0285169 A1 * | 9/2019 | Ahrens | F16H 1/46 |
| 2020/0217397 A1 * | 7/2020 | Ho | F16H 1/28 |
| 2020/0278009 A1 * | 9/2020 | Hudson | B60N 2/02246 |

FOREIGN PATENT DOCUMENTS

| | | |
|---|---|---|
| DE | 19540631 A1 | 5/1997 |
| DE | 19709852 A1 | 9/1998 |
| DE | 10258061 A1 | 6/2004 |
| DE | 10261898 A1 | 7/2011 |
| DE | 202013102360 A1 | 6/2013 |
| DE | 102015223485 A1 | 6/2017 |
| DE | 102018204051 A1 | 9/2019 |
| DE | 102019103915 A1 | 8/2020 |
| WO | 2020020754 A1 | 1/2020 |

OTHER PUBLICATIONS

German Patent Office First Action for Appl. No. 10 2022 113 116.5, dated Mar. 13, 2023, Munich Germany, 7 pages.

* cited by examiner

*Primary Examiner* — Philip F Gabler
(74) *Attorney, Agent, or Firm* — Marshall & Melhorn, LLC

(57) ABSTRACT

An adjusting device for a vehicle seat for adjusting a component of the vehicle seat, may have a tube, a motor and a pinion which is drivable by the motor. The motor and the pinion may be arranged in the tube. In addition, a vehicle seat may have a transverse tube, a component which is movable relative to the transverse tube and the adjusting device for adjusting the component relative to the transverse tube.

13 Claims, 3 Drawing Sheets

ADJUSTING DEVICE FOR A VEHICLE SEAT AND VEHICLE SEAT

FIELD

The invention relates to an adjusting device for a vehicle seat for adjusting a component of the vehicle seat relative to a transverse tube of the vehicle seat.

BACKGROUND

Drive devices for operating or adjusting a seat function are known both for vehicle seat height adjusters and for backrest adjusters. Frequently, said drive devices are electrical drives or mechanical bi-directional stepping mechanisms, the actuating angle thereof generally being 15° to 30°, and which transmit only the actuating direction and are decoupled from the output on the return path. Such mechanisms are commonplace as load absorption systems in height adjusters. When used as backrest adjusters, generally the driven backrest fitting which is configured as a geared fitting absorbs the working loads and crash loads. Known drive devices are disclosed, for example, in DE 197 09 852 A1 and DE 195 40 631 A1.

A vehicle seat is disclosed in WO 2020/020754 A1 having an adjustment kinematics with movable rockers, wherein at least one rocker is rotatably mounted about an axis and a toothed segment which is connected to the at least one rocker is provided, wherein the vehicle seat has a drive for moving the at least one rocker and the drive is mounted on a seat frame, in particular on a seat frame side part of the seat frame, wherein a pinion of the drive is in toothed engagement with the toothed segment, wherein the pinion is positioned without play relative to the toothed segment by an orientation of the position of the entire drive relative to the side part by a compensation body.

A height adjuster for a vehicle seat is disclosed in DE 10 2015 223 485 A1, wherein an orientation of a base plate, which is mounted on a side part and which holds a drive, is implemented relative to the side part of the vehicle seat by a crash bolt.

SUMMARY

The object of the invention is to improve an adjusting device for a vehicle seat of the type mentioned in the introduction, in particular to reduce the installation space for such an adjusting device. The object of the invention is also to provide a corresponding vehicle seat.

This object is achieved according to the invention by an adjusting device for a vehicle seat for adjusting a component of the vehicle seat, the adjusting device having a tube, a motor and a pinion which is drivable by the motor, wherein the motor and the pinion are arranged in the tube.

As the motor and the pinion are arranged in the tube, an installation space which is required in the vehicle seat for accommodating the adjusting device may be advantageously reduced.

A tube is to be understood to mean an elongated hollow body. A cross section of the tube may be uniform over the length of the tube. Alternatively, the cross section of the tube may vary over the length of the tube. A central axis of the tube may run in a linear manner. A central axis of the tube may run in a curved manner in some sections. A central axis of the tube may run in an entirely curved manner. The tube may have a circular cross section, wherein the length of the tube is larger than the diameter thereof.

Advantageous embodiments, which may be used individually or in combination with one another, form the subject of the subclaims.

The motor is preferably entirely arranged in the tube, wherein a cable for conducting energy and/or signals may be guided out of the tube. The pinion is preferably entirely arranged in the tube.

The adjusting device has a motor. The motor may be an electric motor. The motor may have a cylindrical basic shape. A housing of the motor may have a cylindrical basic shape. The motor may entirely fill a cross section of the transverse tube. A cross section of the motor may correspond to a cross section of the transverse tube. The motor may be secured against rotation in the transverse tube. The motor may be secured against displacement in the transverse tube.

The motor may directly drive the pinion. The motor may have a shaft. The shaft may drive the pinion on a side of the motor, in particular at least indirectly via a gear mechanism. The shaft may be connected on one side of the motor to a gear mechanism.

The motor may have a continuous shaft. The shaft may drive in each case a pinion on both sides of the motor, in particular at least in each case indirectly via a gear mechanism. The shaft may be connected on both sides of the motor to one respective gear mechanism.

The adjusting device may have a gear mechanism. The motor may drive the pinon by a gear mechanism. The gear mechanism may be arranged in the tube. The gear mechanism is preferably entirely arranged in the tube. The gear mechanism may be a planetary gear. The gear mechanism may be a multi-stage gear mechanism. The gear mechanism may be a multi-stage planetary gear. The adjusting device may have two gear mechanisms.

The gear mechanism preferably has three gear stages. At least one of the three gear stages has a sun gear, at least one planet gear and a ring gear. At least one of the three gear stages has a sun gear, three planet gears and a ring gear. Preferably, a plurality of gear stages comprise a sun gear, a plurality, in particular three, planet gears and a ring gear.

An output pinion of the motor may be a sun gear of a first gear stage. The pinion may be driven by the last, in particular third, gear stage. The pinion may be connected to a crosspiece of the last, in particular third, gear stage. At least one ring gear of a gear stage may be rotatably mounted in the tube. Two adjacent ring gears of two gear stages may be mounted on one another in each case.

The gear mechanism may be a step-down gear mechanism. The gear mechanism may be a step-up gear mechanism. The gear mechanism may have a gear housing. The gear housing may have a flange. The motor may be connectable to the flange of the gear housing. The gear mechanism may be connected on the output side to the pinion.

The adjusting device has a pinion. The pinion may be driven by the motor. The adjusting device may have two pinions. The two pinons may be drivable by the one motor. The two pinions may be drivable by one respective motor. Each of the pinons may be arranged in each case on a tube side. Each of the pinions may be arranged in each case on a vehicle seat side. The pinion may have a diameter which is smaller than the internal diameter of the tube.

The tube may have an opening in the region of the pinion. The tube may have an opening in the region of each pinion.

The object underlying the invention is also achieved by a vehicle seat having a transverse tube, a component which is movable relative to the transverse tube, and an adjusting device according to the invention for adjusting the component relative to the transverse tube.

The transverse tube is preferably formed by the tube of the adjusting device. Thus, after the vehicle seat has been mounted, the tube of the adjusting device is a structural component, namely the transverse tube, of the vehicle seat. As a result, costs and weight of the vehicle seat may be reduced.

A transverse tube is understood to mean a tube which connects together fixedly in terms of rotation or rotatably at least two components of the vehicle seat which are spaced apart from one another in a transverse direction. The transverse tube may run in some sections parallel to the transverse direction. The transverse tube may run entirely parallel to the transverse direction.

The transverse tube may be mounted in at least one seat frame side part or backrest frame side part. The transverse tube may be rotatably mounted in at least one seat frame side part or backrest frame side part. The transverse tube may connect together two seat frame side parts.

The component may be a base of an adjustment kinematics of the vehicle seat. The adjustment kinematics may be a kinematics of an armrest. In this case, a rocker connected to the transverse tube may act on an armrest, in particular an angular position of the armrest may be adjustable relative to the backrest.

The adjustment kinematics may be a kinematics of a calf support. In this case, a rocker connected to the transverse tube may act on a kinematics for retracting and extending a calf support.

The adjustment kinematics may be a height-adjustment kinematics. The height-adjustment kinematics, when viewed in the transverse direction, may comprise in each case a four link arrangement on both seat sides of the vehicle seat. The four link arrangement may have four coupling members. The four link arrangement may be formed from a base, a front rocker, a rear rocker and a seat frame. The coupling members of the four link arrangement may be connected together in each case in pairs by a rotary joint. The rotary joints may permit a rotary movement about an axis, in each case parallel to the transverse direction.

A first rotary joint may pivotably connect the base to the rear rocker. A second rotary joint may pivotably connect the rear rocker to the seat frame. A third rotary joint may pivotably connect the seat frame to the front rocker. A fourth rotary joint may pivotably connect the front rocker to the base.

In a manner known per se the seat frame may have in each case a seat frame side part on both seat sides. The seat frame may have a transverse tube. The transverse tube may be the tube of an adjusting device according to the invention. The transverse tube may connect together the two seat frame side parts. The transverse tube may be oriented parallel to a transverse direction. The transverse tube may be fixedly connected to the seat frame side parts. The transverse tube may be rotatably mounted in the seat frame side parts.

The second rotary joint may pivotably connect the rear rocker to the transverse tube of the seat frame. The second rotary joint may pivotably connect the transverse tube to the seat frame side part of the seat frame. The third rotary joint may pivotably connect the seat frame side part to the front rocker.

The transverse tube may be arranged in the region of the second rotary joint. On each of the two seat sides, one end of the respective rear rocker of the four link arrangement may be fixedly connected or rotatably connected to the transverse tube. Alternatively, the transverse tube may be arranged in the region of the third rotary joint. On each of the two seat sides, one end of the respective front rocker of the four link arrangement may be fixedly connected or rotatably connected to the transverse tube.

An arrangement of the transverse tube in the region of the first or fourth rotary joint is also conceivable. In this case, the adjusting device may be fixable to the base.

The vehicle seat may have a toothed segment for each pinion. When driven by the pinion, the toothed segment may be guided in some sections through the opening in the tube. The toothed segment may be a curved toothed segment. The radial centre point of a curvature of the curved toothed segment may coincide with a rotary joint of one of the rockers of the vehicle seat.

The toothed segment may be a toothed rack. The toothed segment may be fixed to an adjusting element. The adjusting element may be articulated in the region of a rotary joint opposing the transverse tube in a four link arrangement.

In summary, and expressed in other words, the proposed solution provides a possibility for integrating a mechanism for seat height adjustment in a transverse tube which connects the seat frame side parts. The mechanism may have a transverse tube, a motor, in particular an electric motor, and a gear mechanism. The gear mechanism may be of modular construction. The gear mechanism may be a planetary gear. The gear mechanism may be made up of a plurality of planetary gear stages. The gear mechanism may have a variable gear ratio. A drive movement may be transmitted by a pinion to a toothed segment. The adjusting device may be arranged on the door side or tunnel side. A use of an adjusting device simultaneously on both sides is also possible.

DESCRIPTION OF THE FIGURES

The invention is described hereinafter in more detail in each case by way of an advantageous exemplary embodiment, shown in the figures, of an adjusting device according to the invention and a vehicle seat according to the invention. However, the invention is not limited to these exemplary embodiments. In the figures, schematically.

DETAILED DESCRIPTION

Figure 1:
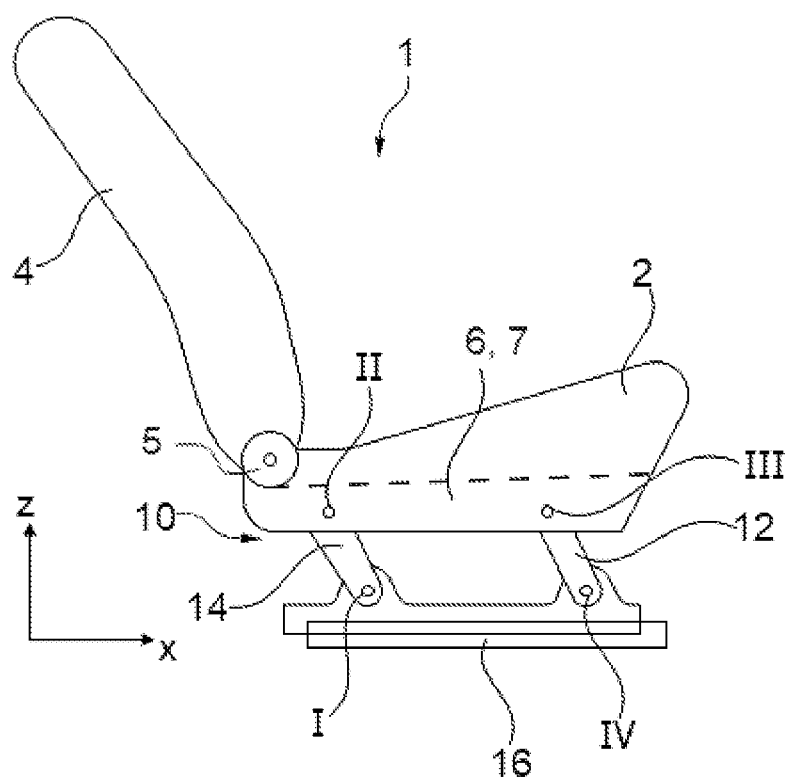
FIG. 1: shows a side view of a vehicle seat according to the invention.

A vehicle seat 1 shown schematically in FIG. 1 is described hereinafter by using three spatial directions running perpendicularly to one another. A longitudinal direction x in a vehicle seat 1 installed in a vehicle runs substantially horizontally and preferably parallel to a vehicle longitudinal direction, which corresponds to the usual direction of travel of the vehicle. A transverse direction y running perpendicular to the longitudinal direction x is also horizontally oriented in the vehicle and runs parallel to a vehicle transverse direction. A vertical direction z runs perpendicularly to the longitudinal direction x and perpendicularly to the transverse direction y. In a vehicle seat 1 installed in the vehicle, the vertical direction z runs parallel to the vehicle vertical axis.

The positional and directional information used, such as for example front, rear, top, bottom and transversely, relate to a viewing direction of an occupant seated on a seat part 2 of the vehicle seat 1 in the normal seating position, wherein the vehicle seat 1 is installed in the vehicle, in a position of use suitable for passenger conveyance, with an upright backrest 4 and is oriented in the direction of travel, as is usual. The vehicle seat 1 according to the invention, however, may also be installed in a different orientation, for example transversely to the direction of travel. Provided it is not described differently, the vehicle seat 1 is constructed mirror-symmetrically to a plane running perpendicularly to the transverse direction y.

The vehicle seat 1 has an adjusting device 100. The vehicle seat 1 is height-adjustable by the adjusting device 100, i.e. a distance in the vertical direction z between a seat surface of the seat part 2 and a vehicle floor may be adjusted, in particular, in order to adapt the vehicle seat 1 to the height of an occupant.

The vehicle seat 1 comprises a seat structure and a plurality of upholstery parts borne by the seat structure, the upholstery parts comprising foam parts and upholstery covers, in particular made of fabric or leather. The backrest 4 has, in particular, a backrest structure. The seat part 2 has, in particular, a seat substructure. The backrest structure and the seat substructure substantially form the seat structure. The backrest structure is pivotably fastened to the seat substructure 2 by two fittings 5.

The vehicle seat 1 is able to be fastened to a base 16, for example having two seat rail pairs, on the vehicle floor of the vehicle. The seat substructure of the seat part 2 comprises an adjustment kinematics 10, in the present case a height-adjustment kinematics 10. The height-adjustment kinematics 10, when viewed in the transverse direction y, comprises in each case on both seat sides a four link arrangement, which is formed in each case from the base 16, a front rocker 12, a rear rocker 14, a seat frame 6 and four rotary joints I, II, III, IV. The base 16, the front rockers 12, the rear rockers 14 and the seat frame 6 are connected together by the rotary joints I, II, III, IV, as described in more detail below.

The seat frame 6 (when viewed in the transverse direction y) comprises in each case on both sides a seat frame side part 7. Additionally, the seat frame 6 has a transverse tube 18. The two seat frame side parts 7 are arranged spaced apart from one another and are connected together by the transverse tube 18. In the present case, the transverse tube 18 is arranged in a rear region of the seat frame 6. In a front region of the seat frame 6, the two seat frame side parts 7 are preferably connected together by a front cross member.

On both seat sides, a first rotary joint I (when viewed in the transverse direction y) pivotably connects in each case the base 16 to the respective rear rocker 14. On both seat sides, a second rotary joint II pivotably connects in each case the respective rear rocker 14 to the seat frame 6. On both seat sides, a third rotary joint III pivotably connects in each case the seat frame 6 to the respective front rocker 12. On both seat sides, a fourth rotary joint IV pivotably connects in each case the front rocker 12 to the base 16. The rotary joints I, II, III, IV permit a rotary movement, respectively about an axis parallel to the transverse direction y.

A distance (a height) between the seat surface of the seat part 2 and the vehicle floor (and thus the base 16) is adjustable by the height-adjustment kinematics 10.

Figure 2:
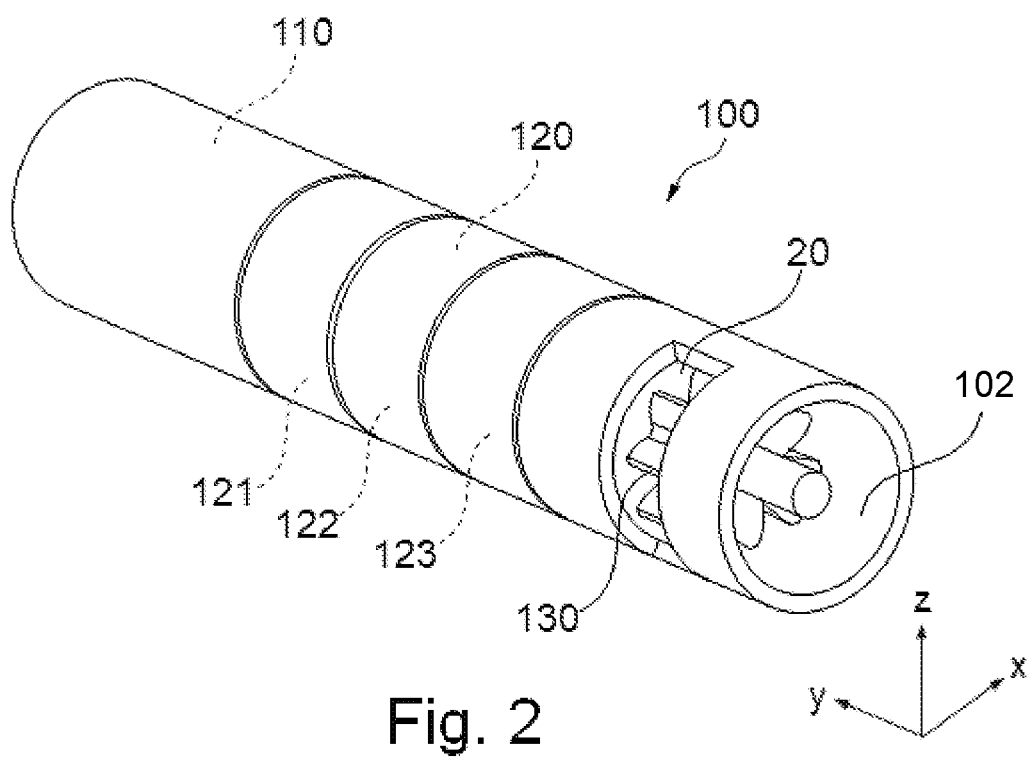
FIG. 2: shows in a simplified view a perspective view of an adjusting device according to the invention of the vehicle seat of FIG. 1, FIG. 3: shows a detail of a view of the vehicle seat of FIG. 1 in the region of the adjusting device.

FIG. 2 shows the constituent parts of the adjusting device 100 according to the invention of the vehicle seat 1. The adjusting device 100 has a tube 102, a motor 110, a gear mechanism 120 and a pinion 130. After the adjusting device 100 has been mounted in the vehicle seat 1, the pinion 130 is in toothed engagement with a toothed segment 140 of the vehicle seat (1) shown in FIGS. 3 and 4. The motor 110, the gear mechanism 120 and the pinion 130 are arranged in the tube 102. By activating the motor 110, the pinion 130 is rotatable and rollable on the toothed segment 140.

After the adjusting device 100 has been mounted in the vehicle seat 1, the adjusting device 100 is a constituent part of the vehicle seat 1.

In the present case, the tube 102 of the adjusting device 100 is used as a transverse tube 18 of the vehicle seat 1. After the adjusting device 100 has been mounted in the vehicle seat 1, the tube 102 is thus identical to the transverse tube 18 which in the present case is both a constituent part of the adjusting device 100 and of the seat frame 6 of the vehicle seat 1. Preferably, the adjusting device 100 is a unit which is capable of being tested even before being mounted in the vehicle seat (1). Alternatively, the transverse tube 18 is mounted in the seat frame 6 before the adjusting device 100 is mounted.

The motor 110 is preferably an electric motor. The motor 110 has a substantially cylindrical shape. The motor 110 fills substantially entirely a cross section of the tube 102. The motor 110 is secured, preferably positively secured, against rotation in the tube 102.

In the present case the gear mechanism 120 is a multi-stage planetary gear. In the present case the gear mechanism 120 has a first gear stage 121, a second gear stage 122, and a third gear stage 123. The gear mechanism 120 may, however, in modifications of the exemplary embodiment have a number of gear stages deviating therefrom, for example exactly one gear stage. In a further modification of the exemplary embodiment, the gear mechanism may be dispensed with and the motor may directly drive the pinion.

Each of the three gear stages 121, 122, 123 is configured as a planetary gear. In a manner known per se, each of the three gear stages 121, 122, 123 has a sun gear, three planet gears and a ring gear. An output pinion of the motor 110 may be the sun gear of the first gear stage 121. The pinion 130 may be driven by the third gear stage 123. The ring gears of the three gear stages 121, 122, 123 are preferably rotatably mounted in the tube 102. In each case, two adjacent ring gears of the three gear stages 121, 122, 123 may be mounted on one another.

The pinion 130 is able to be driven by the motor 110 via the gear mechanism 120. The pinion 130 has a diameter which is less than an internal diameter of the tube 102. The pinion 130 is rotatably arranged in the tube 102. The tube 102 has an opening 20 in the region of the pinion 130.

Figure 3:
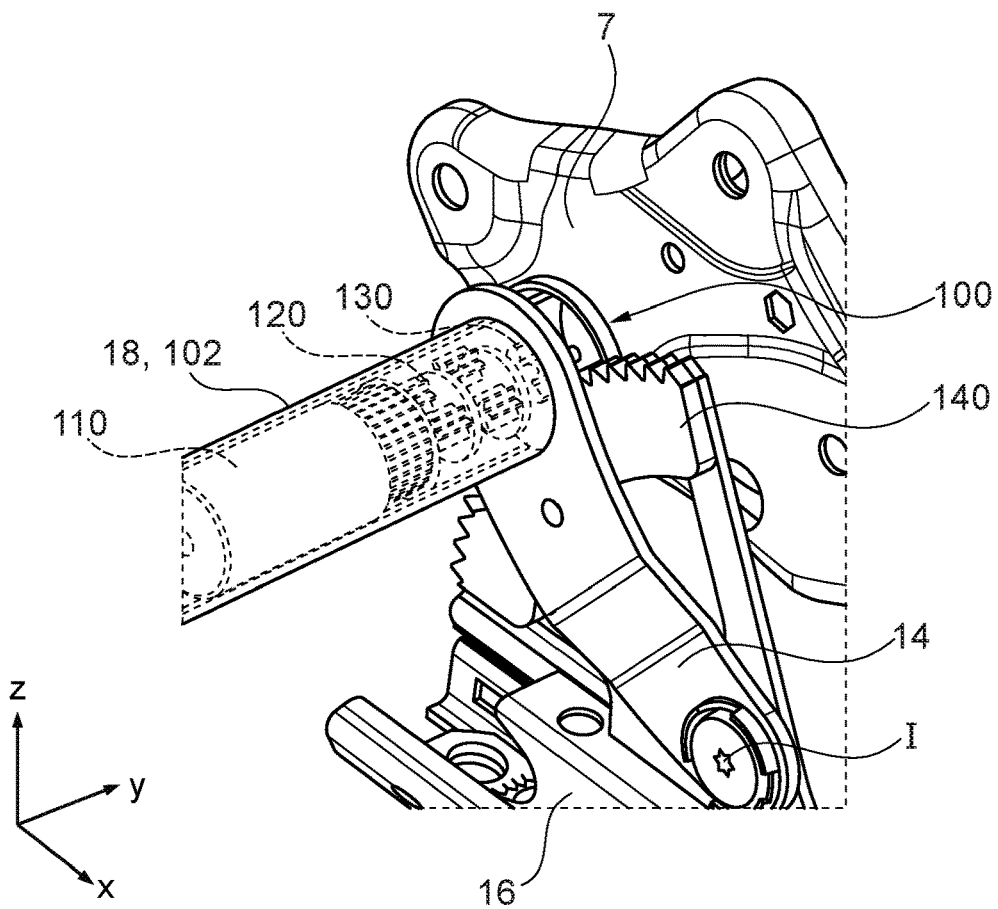
Figure 4:
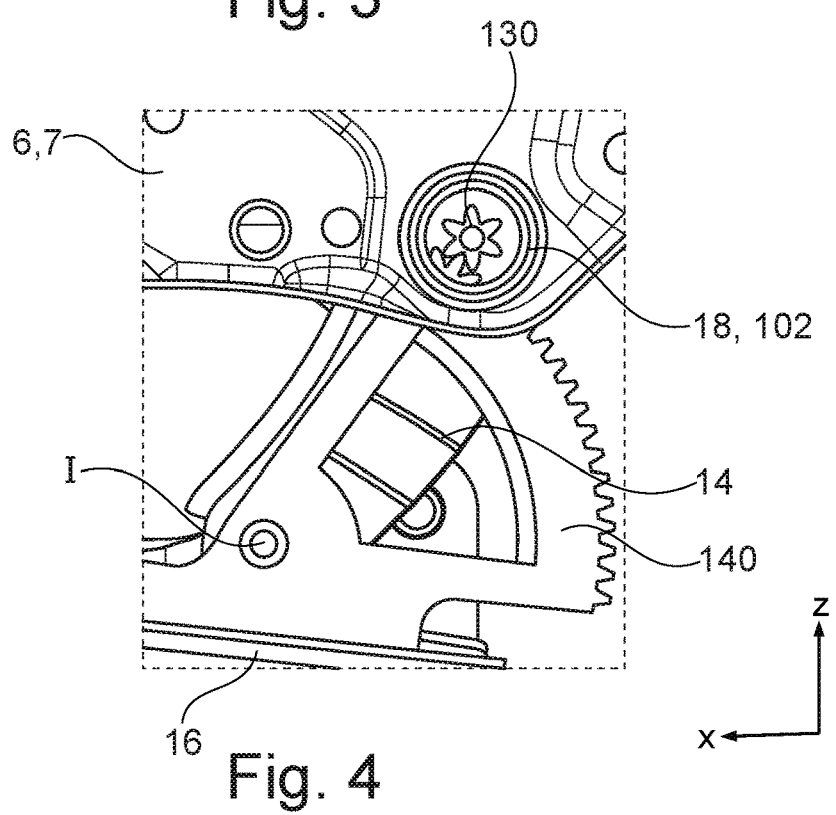
FIG. 4: shows a detail of a side view of the vehicle seat of FIG. 1 in the region of the adjusting device.

FIGS. 3 and 4 show the adjusting device 100 according to the invention installed in the vehicle seat 1 of FIG. 1. The tube 102 of the adjusting device 102 is identical to the transverse tube 18 of the vehicle seat (1). In the present case, the transverse tube 18 is arranged by way of example in the region of the second rotary joint II. The transverse tube 18 may be alternatively arranged in a region of one of the other rotary joints I, III, IV. In the present case, one respective end of the rear rocker 14 of the four link arrangement (I, II, III, IV) is fixedly connected to the transverse tube 18. The transverse tube 18 is rotatably mounted in the two seat frame side parts 7 of the seat frame 6, in particular on both sides, in each case in a collar of the respective seat frame side part 7. The two second rotary joints II are thus formed by the transverse tube 18 and the two seat frame side parts 7, preferably with the interposition of a bearing bush.

The toothed segment 140 has a toothing which is in toothed engagement with the pinion 130. In a mounted state of the vehicle seat 1, the toothed segment 140 is inserted in some sections through the opening 20 into the transverse tube 18. The motor 110 serves to drive the pinion 130 and thus to drive a rolling movement between the pinion 130 and the toothed segment 140.

In the present case, the toothed segment 140 is a curved toothed segment. In the present case, the toothed segment 140 has a toothing running in a circular segment-shaped manner. The centre point of the curvature of the toothing of the toothed segment 140 coincides with the first rotary joint I of the vehicle seat 1, the rear rocker 14 being rotatable about said first rotary joint. The toothed segment 140 is fixedly connected to the base 16. When the pinion 130 is driven, the tube 102 of the adjusting device 100 (the transverse tube 18) travels along the toothing of the toothed segment 140. In this case, the transverse tube 18 entrains the rear rocker 14 which is connected fixedly to the transverse tube 18, and pivots this rear rocker about the first rotary joint I of the vehicle seat 1. As a result, a movement of the height-adjustment kinematics 10 takes place and thus a change to the height adjustment of the vehicle seat 1.

Figure 5:
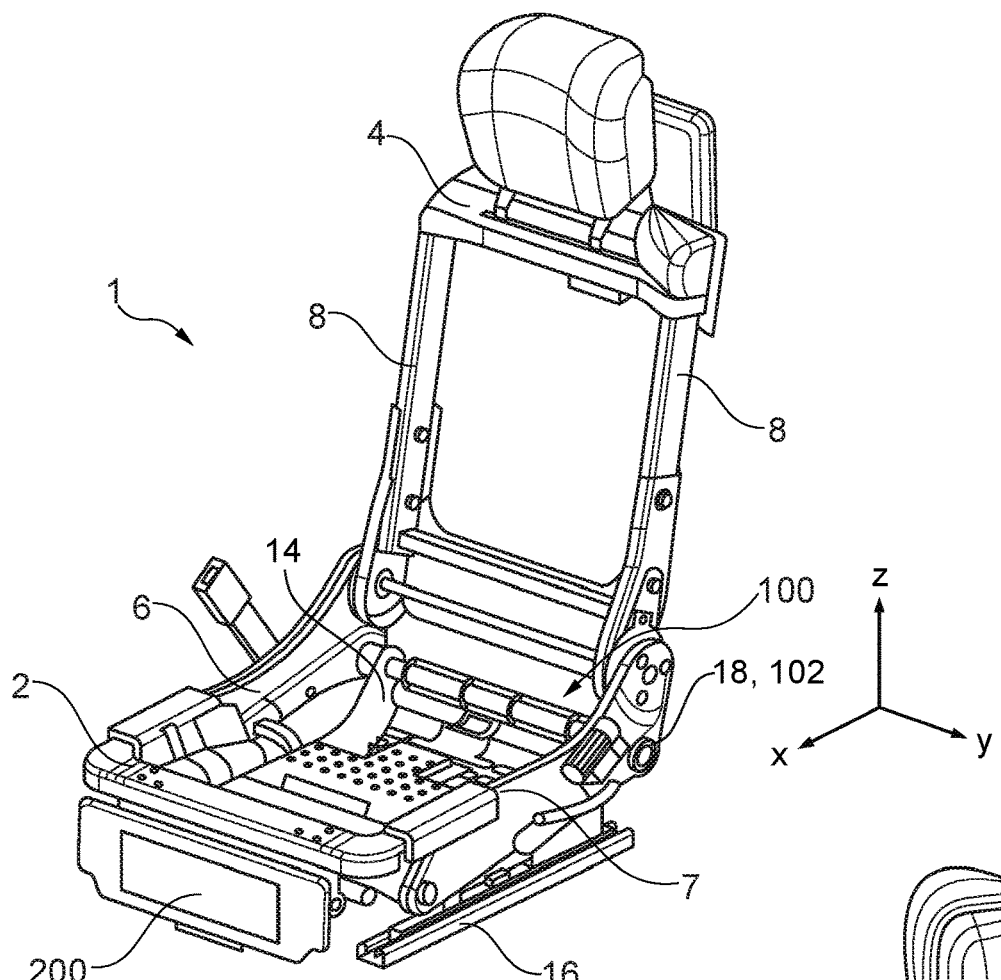
FIG. 5: shows a perspective view of the vehicle seat of FIG. 1, and FIG. 6: shows a side view of the vehicle seat of FIG. 1.
Figure 6:
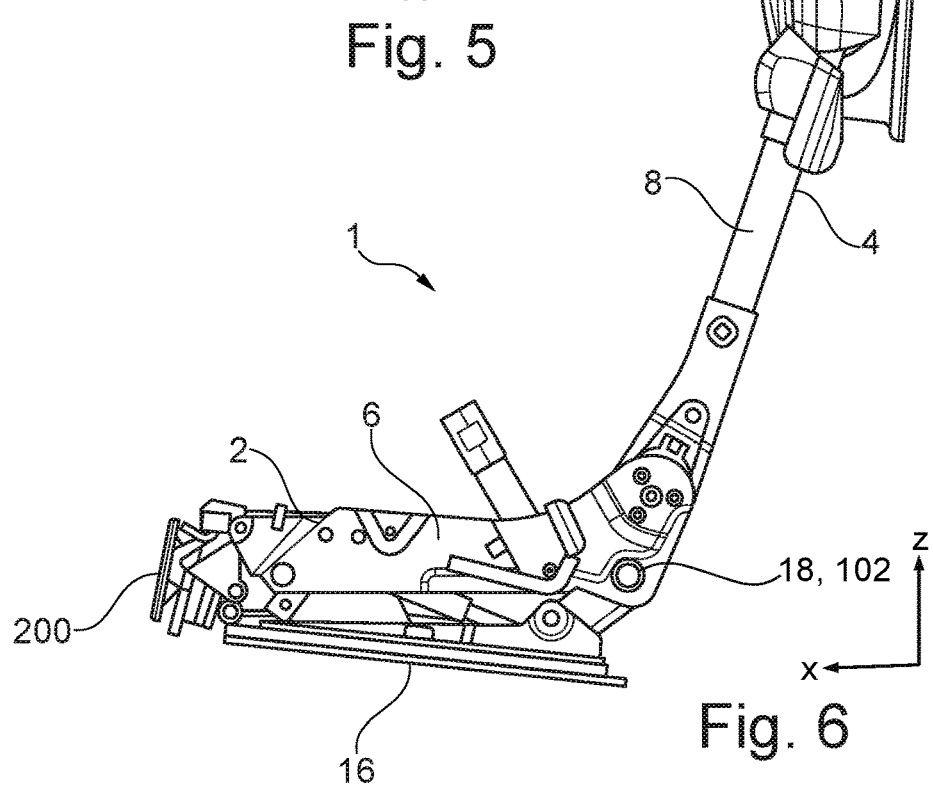

FIGS. 5 and 6 show further views of the vehicle seat 1 of FIG. 1.

The backrest 4 of the vehicle seat 1 has on each seat side a backrest frame side part 8. In the present case, the vehicle seat 1 has a calf support 200. The calf support 200 may also be adjustable by an adjusting device according to the invention.

The features disclosed in the present description, the claims and the drawings may be important both individually and in combination for the implementation of the invention in the various embodiments thereof.

LIST OF REFERENCE NUMERALS

1 Vehicle seat
2 Seat part
4 Backrest
5 Fitting
6 Seat frame
7 Seat frame side part
8 Backrest frame side part
10 Adjustment kinematics (height-adjustment kinematics)
12 Front rocker
14 Rear rocker
16 Base
18 Transverse tube
20 Opening
100 Adjusting device
102 Tube
110 Motor
120 Gear mechanism
121 First gear stage
122 Second gear stage
123 Third gear stage
130 Pinion
140 Toothed segment
200 Calf support
I First rotary joint
II Second rotary joint
III Third rotary joint
IV Fourth rotary joint
x Longitudinal direction
y Transverse direction
z Vertical direction

The invention claimed is:

1. An adjusting device for a vehicle seat for adjusting a component of the vehicle seat, the device comprising:
   a tube,
   a motor and
   a pinion which is drivable by the motor,
   wherein the motor and the pinion are arranged in the tube,
   wherein the tube has a window adjacent the pinion and a toothed segment of the adjusting device extends into the window to engage the pinion.

2. The adjusting device according to claim 1, wherein the motor drives the pinion by a gear mechanism.

3. The adjusting device according to claim 2, wherein the gear mechanism is arranged in the tube.

4. The adjusting device according to claim 2, wherein the gear mechanism has at least one gear stage.

5. The adjusting device according to claim 4, wherein at least one of said at least one gear stage is configured as a planetary gear stage.

6. The adjusting device according to claim 2, wherein the gear mechanism has a plurality of gear stages.

7. The adjusting device according to claim 4, wherein all of the gear stages of the at least one gear stage are configured as planetary gear stages.

8. A vehicle seat having a transverse tube and the adjusting device according to claim 1, the adjusting device arranged for adjusting the toothed segment relative to the transverse tube.

9. The vehicle seat according to claim 8, wherein the transverse tube is formed by the tube of the adjusting device.

10. The vehicle seat according to claim 8, wherein the toothed segment cooperates with the pinion such that the component and the transverse tube are movable relative to one another.

11. The vehicle seat according to claim 8, wherein the component is a constituent part of an adjustment kinematics of the vehicle seat.

12. The vehicle seat according to claim 11, wherein the adjustment kinematics comprise at least one four link arrangement for a height adjustment of the vehicle seat.

13. The vehicle seat according to claim 8, wherein the constituent part comprises a base of height-adjustment kinematics of the vehicle seat.

* * * * *